United States Patent
Kulkarni et al.

(10) Patent No.: US 11,468,553 B2
(45) Date of Patent: Oct. 11, 2022

(54) SYSTEM AND METHOD FOR DETERMINING TYPE AND SIZE OF DEFECTS ON BLANK RETICLES

(71) Applicant: KLA Corporation, Milpitas, CA (US)

(72) Inventors: Ramaprasad Kulkarni, Milpitas, CA (US); Ge Cong, Pleasanton, CA (US); Hawren Fang, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/572,971

(22) Filed: Sep. 17, 2019

(65) Prior Publication Data

US 2020/0143528 A1    May 7, 2020

Related U.S. Application Data

(60) Provisional application No. 62/754,880, filed on Nov. 2, 2018.

(51) Int. Cl.
*G06T 7/00*       (2017.01)
*G06N 20/00*      (2019.01)
(Continued)

(52) U.S. Cl.
CPC .............. *G06T 7/001* (2013.01); *G06K 9/627* (2013.01); *G06K 9/628* (2013.01); *G06N 20/00* (2019.01);
(Continued)

(58) Field of Classification Search
CPC combination set(s) only.
See application file for complete search history.

(56) References Cited

U.S. PATENT DOCUMENTS

| | | | |
|---|---|---|---|
| 6,798,515 B1 * | 9/2004 | Bachelder .............. | G03B 11/00 356/388 |
| 6,999,614 B1 * | 2/2006 | Bakker ................. | G06T 7/0004 382/145 |

(Continued)

FOREIGN PATENT DOCUMENTS

JP      4890096 B2      3/2012

OTHER PUBLICATIONS

International Search Report and Written Opinion dated Feb. 25, 2020 for PCT/US2019/059291.

*Primary Examiner* — Zhiyu Lu
(74) *Attorney, Agent, or Firm* — Suiter Swantz pc llo

(57) ABSTRACT

A system for characterizing a specimen is disclosed. In one embodiment, the system includes a controller configured to: receive training images of one or more defects of the specimen; generate a machine learning classifier based on the training images; receive product images of one or more defects of a specimen; determine one or more defect type classifications of one or more defects with the machine learning classifier; filter the product images with one or more smoothing filters; perform binarization processes to generate binarized product images; perform morphological image processing operations on the binarized product images; determine one or more algorithm-estimated defect sizes of the one or more defects based on the binarized product images; and determine one or more refined estimates of one or more defect sizes of the one or more defects based on the one or more algorithm-estimated defect sizes and the one or more defect type classifications.

23 Claims, 11 Drawing Sheets

(51) Int. Cl.
  *G06T 7/62* (2017.01)
  *G06K 9/62* (2022.01)
  *G06T 3/40* (2006.01)
  *G06T 5/00* (2006.01)

(52) U.S. Cl.
  CPC ............ *G06T 3/40* (2013.01); *G06T 5/003* (2013.01); *G06T 7/62* (2017.01); *G06T 2207/10024* (2013.01); *G06T 2207/20036* (2013.01); *G06T 2207/20081* (2013.01)

(56) References Cited

U.S. PATENT DOCUMENTS

| | | | |
|---|---|---|---|
| 7,162,073 B1 | 1/2007 | Akgul et al. | |
| 7,831,083 B1 * | 11/2010 | Lauber | G01N 21/9501 |
| | | | 382/199 |
| 8,045,145 B1 * | 10/2011 | Bakker | G01N 21/95607 |
| | | | 356/237.1 |
| 9,401,016 B2 | 7/2016 | Kulkarni | |
| 10,733,723 B2 * | 8/2020 | Diao | G06K 9/6206 |
| 2005/0004774 A1 | 1/2005 | Volk et al. | |
| 2007/0280526 A1 * | 12/2007 | Malik | G06T 7/001 |
| | | | 382/149 |
| 2008/0032429 A1 * | 2/2008 | Chen | G06T 7/001 |
| | | | 438/14 |
| 2010/0272334 A1 | 10/2010 | Yamada et al. | |
| 2013/0077092 A1 * | 3/2013 | Sasazawa | G01N 21/94 |
| | | | 356/237.5 |
| 2015/0265144 A1 * | 9/2015 | Burlina | A61B 3/12 |
| | | | 351/206 |
| 2015/0332445 A1 * | 11/2015 | Harada | G01N 21/9501 |
| | | | 382/149 |
| 2016/0110858 A1 * | 4/2016 | Liu | G06K 9/6218 |
| | | | 382/149 |
| 2016/0371816 A1 * | 12/2016 | Choudhury | G06T 7/254 |
| 2018/0173839 A1 * | 6/2018 | Fang | G06T 7/0004 |
| 2018/0218493 A1 * | 8/2018 | Zhang | G06F 16/25 |
| 2019/0012579 A1 * | 1/2019 | Namiki | G06T 7/0002 |
| 2019/0259145 A1 * | 8/2019 | Kong | G06N 20/00 |
| 2019/0279890 A1 * | 9/2019 | Mori | G01N 21/956 |
| 2019/0362480 A1 * | 11/2019 | Diao | G06T 7/001 |
| 2019/0362486 A1 * | 11/2019 | Diao | G06K 9/6212 |

* cited by examiner

SYSTEM AND METHOD FOR DETERMINING TYPE AND SIZE OF DEFECTS ON BLANK RETICLES

CROSS-REFERENCE TO RELATED APPLICATION

The present application claims priority to U.S. Provisional Patent Application No. 62/754,880, filed Nov. 2, 2018, entitled METHOD FOR DETERMINING SIZE AND TYPE OF DEFECTS OF BLANK RETICLES, naming Ramaprasad Kulkarni, Ge Cong, and Hawren Fang as inventors, which is incorporated herein by reference in the entirety.

TECHNICAL FIELD

The present invention generally relates to the fields of specimen characterization and metrology and, more particularly, to a system and method for determining the type and size of defects utilizing machine learning techniques.

BACKGROUND

Demand for electronic logic and memory devices with ever-smaller footprints and features presents a wide range of manufacturing challenges beyond fabrication at a desired scale. In the context of semiconductor fabrication, accurately identifying the type and size of defects is an important step in improving throughput and yield. In particular, fabrication and inspection processes require the size of defects to be determined accurately within 15-20% of the actual defect size.

Using conventional techniques, defect sizes are estimated by computing the area of pixels belonging to defects in images and multiplying it by the pixel size. While these conventional techniques may be used to determine the size of defects between approximately 80-200 nm, these conventional techniques are unable to determine the size of defects outside of this narrow range (e.g., defects smaller than 80 nm, defects larger than 200 nm). Furthermore, conventional techniques are often unable to determine the type of defect being inspected. The inability to determine defect types further limits the ability of conventional techniques to accurately determine the size of defects within 15-20% of the actual defect size.

Therefore, it would be desirable to provide a system and method that cure one or more of the shortfalls of the previous approaches identified above.

SUMMARY

A system for characterizing a specimen is disclosed. In one embodiment, the system includes a controller including one or more processors configured to execute a set of program instructions stored in memory, the set of program instructions configured to cause the one or more processors to: receive one or more training images of one or more defects of the specimen; generate a machine learning classifier based on the one or more training images; receive one or more product images of one or more defects of a specimen; determine one or more defect type classifications of the one or more defects with the machine learning classifier; filter the one or more product images with one or more smoothing filters; perform one or more binarization processes to generate one or more binarized product images; perform one or more morphological image processing operations on the one or more binarized product images; determine one or more algorithm-estimated defect sizes of the one or more defects based on the one or more binarized product images; and determine one or more refined estimates of one or more defect sizes of the one or more defects based on the one or more algorithm-estimated defect sizes and the one or more defect type classifications.

A system for characterizing a specimen is disclosed. In one embodiment, the system includes an inspection sub-system configured to acquire one or more images of a specimen. In another embodiment, the system includes a controller communicatively coupled to the inspection sub-system, the controller configured to: receive one or more training images of one or more defects of the specimen from the inspection sub-system; generate a machine learning classifier based on the one or more training images; receive one or more product images of one or more defects of a specimen from the inspection sub-system; determine one or more defect type classifications of the one or more defects of the product images with the machine learning classifier; perform one or more morphological image processing operations on the one or more product images; determine one or more algorithm-estimated defect sizes of the one or more defects based on the one or more product images; and determine one or more refined estimates of one or more defect sizes of the one or more defects based on the one or more algorithm-estimated defect sizes and the one or more defect type classifications.

A method for characterizing a specimen is disclosed. In one embodiment, the method includes: acquiring one or more training images of one or more defects of a specimen; generating a machine learning classifier based on the one or more training images; acquiring one or more product images of one or more defects of a specimen; determining one or more defect type classifications of the one or more defects with the machine learning classifier; filtering the one or more product images with one or more smoothing filters; performing one or more binarization processes to generate one or more binarized product images; performing one or more morphological image processing operations on the one or more binarized product images; determining one or more algorithm-estimated defect sizes of the one or more defects based on the one or more binarized product images; and determining one or more refined estimates of one or more defect sizes of the one or more defects based on the one or more algorithm-estimated defect sizes and the one or more defect type classifications.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Embodiments of the present disclosure are directed toward a system and method for determining the type and size of defects using image processing and machine learning techniques. In particular, embodiments of the present disclosure are directed to a system and method capable of accurately determining the size of defects within 15-20% of the actual defect size. Moreover, embodiments of the present disclosure are directed to a system and method capable of accurately determining the type and size of defects for a wide range of actual defect sizes. Additional embodiments of the present disclosure are directed to utilizing machine learning techniques to determine a defect type classification which may be used to more accurately determine the size of the defects.

Figure 1A:
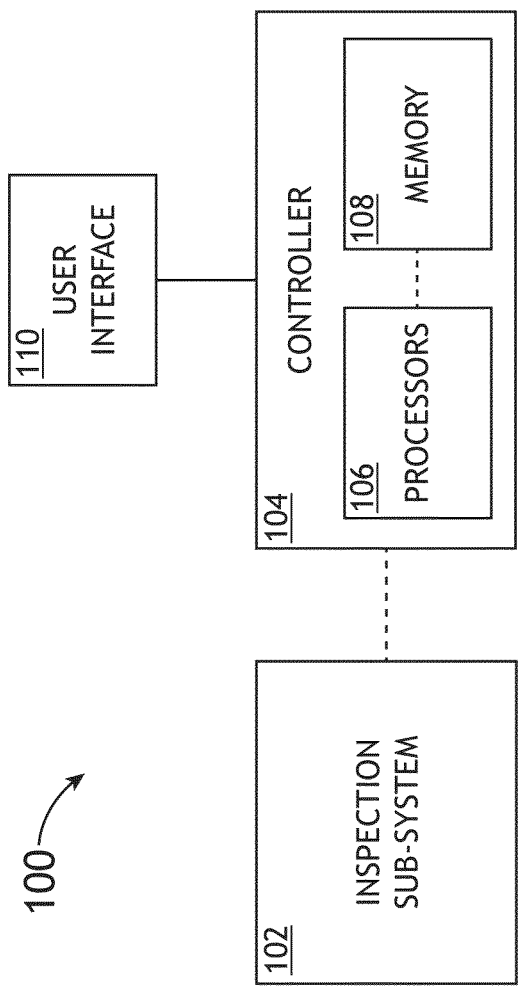
FIG. 1A illustrates a system for characterizing a specimen, in accordance with one or more embodiments of the present disclosure.

FIG. 1A illustrates a system 100 for characterizing a specimen, in accordance with one or more embodiments of the present disclosure. In particular, FIG. 1A illustrates a system 100 for determining type and size of defects on blank reticles using machine learning techniques. The system 100 may include, but is not limited to, one or more inspection sub-systems 102. The system 100 may additionally include, but is not limited to, a controller 104 including one or more processors 106, a memory 108, and a user interface 110.

The inspection sub-system 102 may include any inspection sub-system 102 known in the art including, but not limited to, an optical-based inspection system, a charged particle-based inspection system, and the like. For example, the inspection sub-system 102 may include an optical-based dark-field inspection system. By way of another example, the inspection sub-system 102 may include a scanning electron microscopy (SEM) inspection system. In one embodiment, the controller 104 is communicatively coupled to the one or more inspection sub-systems 102. In this regard, the one or more processors 106 of the controller 104 may be configured to generate one or more control signals configured to adjust one or more characteristics of the inspection sub-system 102.

Figure 1B:
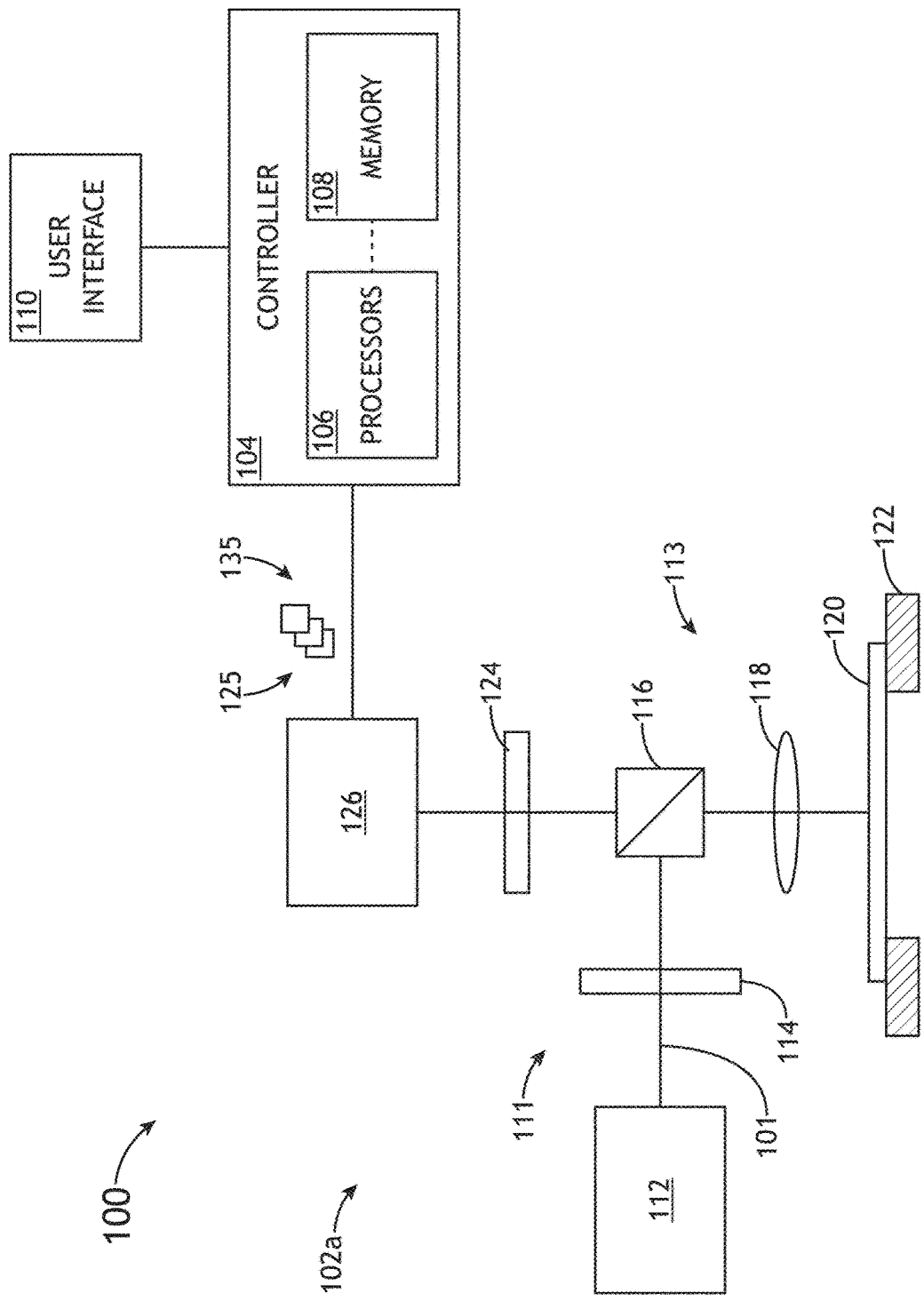
FIG. 1B illustrates a system for characterizing a specimen, in accordance with one or more embodiments of the present disclosure.

FIG. 1B illustrates a system 100 for characterizing a specimen, in accordance with one or more embodiments of the present disclosure. In particular, FIG. 1B illustrates a system 100 including an optical inspection sub-system 102a.

The optical inspection sub-system 102a may include any optical-based inspection/characterization system known in the art including, but not limited to, an image-based metrology tool, a review tool, and the like. For example, the optical inspection sub-system 102a may include an optical dark-field inspection tool. The optical inspection sub-system 102a may include, but is not limited to, an illumination source 112, an illumination arm 111, a collection arm 113, and a detector assembly 126.

In one embodiment, optical inspection sub-system 102a is configured to inspect and/or measure the specimen 120 disposed on the stage assembly 122. Illumination source 112 may include any illumination source known in the art for generating illumination 101 including, but not limited to, a broadband radiation source. In another embodiment, optical inspection sub-system 102a may include an illumination arm 111 configured to direct illumination 101 to the specimen 120. It is noted that illumination source 112 of optical inspection sub-system 102a may be configured in any orientation known in the art including, but not limited to, a dark-field orientation, a light-field orientation, and the like. For example, the one or more optical elements 114, 124 may be selectably adjusted in order to configure the optical inspection sub-system 102a in a dark-field orientation, a bright-field orientation, and the like.

Specimen 120 may include any specimen known in the art including, but not limited to, a wafer, a reticle, a photomask, and the like. For example, the specimen 120 may include a blank reticle. In one embodiment, specimen 120 is disposed on a stage assembly 122 to facilitate movement of specimen 120. In another embodiment, the stage assembly 122 is an actuatable stage. For example, the stage assembly 122 may include, but is not limited to, one or more translational stages suitable for selectably translating the specimen 120 along one or more linear directions (e.g., x-direction, y-direction and/or z-direction). By way of another example, the stage assembly 122 may include, but is not limited to, one or more rotational stages suitable for selectively rotating the specimen 120 along a rotational direction. By way of another example, the stage assembly 122 may include, but is not limited to, a rotational stage and a translational stage suitable for selectably translating the specimen 120 along a linear direction and/or rotating the specimen 120 along a rotational direction. It is noted herein that the system 100 may operate in any scanning mode known in the art.

The illumination arm 111 may include any number and type of optical components known in the art. In one embodiment, the illumination arm 111 includes one or more optical elements 114, a set of one or more optical elements 114, a beam splitter 116, and an objective lens 118. In this regard, illumination arm 111 may be configured to focus illumination 101 from the illumination source 112 onto the surface of the specimen 120. The one or more optical elements 114 may include any optical elements known in the art including, but not limited to, one or more mirrors, one or more lenses, one or more polarizers, one or more beam splitters, wave plates, and the like.

In another embodiment, optical inspection sub-system 102a includes a collection arm 113 configured to collect illumination 101 reflected or scattered from specimen 120. In another embodiment, collection arm 113 may direct and/or focus the reflected and scattered light to one or more sensors of a detector assembly 126 via one or more optical elements 124. The one or more optical elements 124 may include any optical elements known in the art including, but not limited to, one or more mirrors, one or more lenses, one or more polarizers, one or more beam splitters, wave plates, and the like. It is noted that detector assembly 126 may include any sensor and detector assembly known in the art for detecting illumination reflected or scattered from the specimen 120.

In another embodiment, the detector assembly 126 of the optical inspection sub-system 102a is configured to collect metrology data of the specimen 120 based on illumination reflected or scattered from the specimen 120. In another embodiment, the detector assembly 126 is configured to transmit collected/acquired images and/or metrology data to the controller 104.

As noted previously herein, the controller 104 of system 100 may include one or more processors 106 and memory 108. The memory 108 may include program instructions configured to cause the one or more processors 106 to carry out various steps of the present disclosure. In one embodiment, the program instructions are configured to cause the one or more processors 106 to adjust one or more characteristics of the optical inspection sub-system 102a in order to perform one or more measurements of the specimen 120.

In additional and/or alternative embodiments, the inspection sub-system 102 may include a charged particle-based inspection sub-system 102. For example, the inspection sub-system 102 may include an SEM characterization sub-system, as illustrated in FIG. 1C.

Figure 1C:
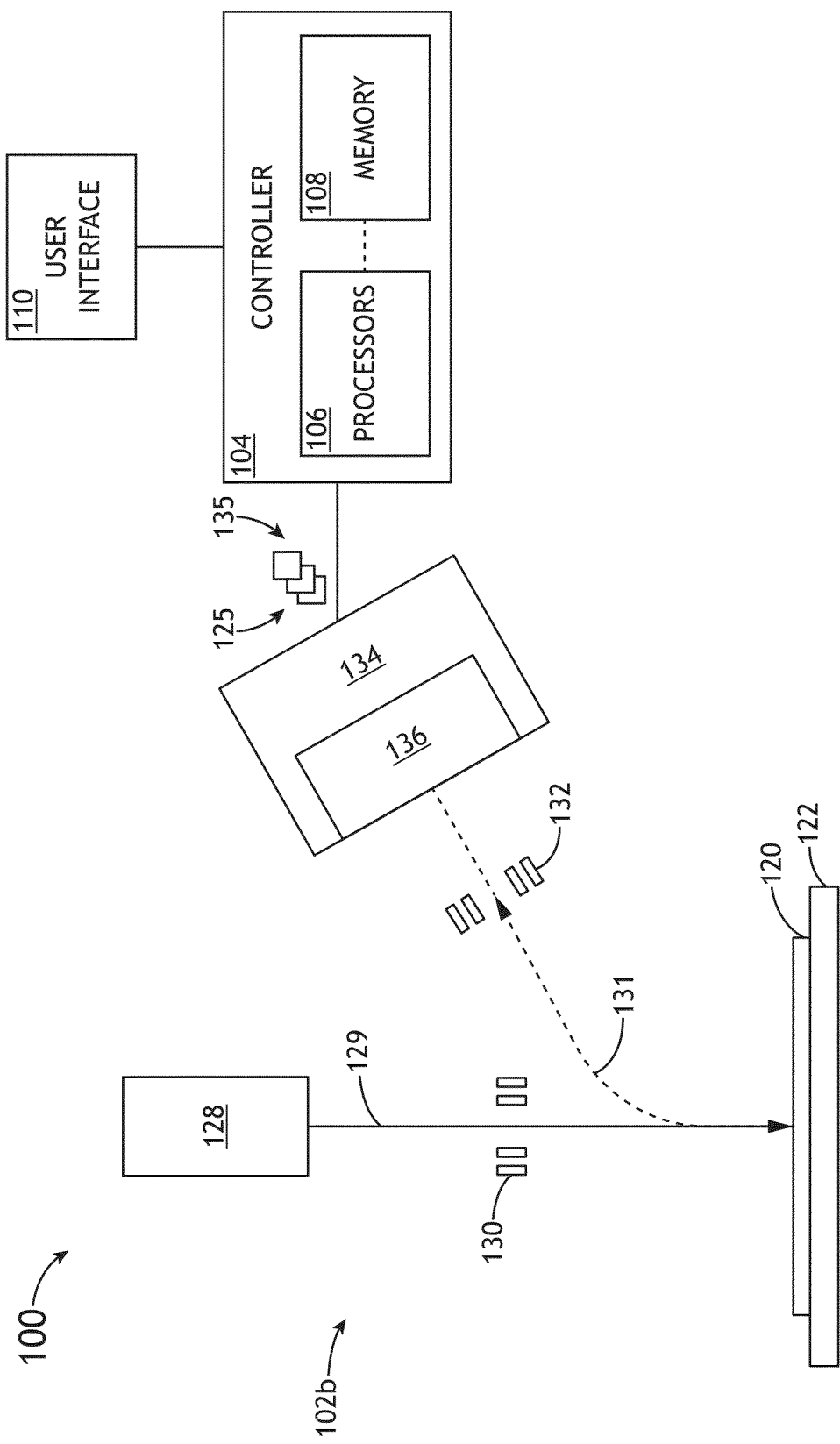
FIG. 1C illustrates a system for characterizing a specimen, in accordance with one or more embodiments of the present disclosure.

FIG. 1C illustrates a system 100 for characterizing a specimen 120, in accordance with one or more embodiments of the present disclosure. In particular, FIG. 1C illustrates a system 100 including an SEM inspection sub-system 102b.

In one embodiment, the SEM inspection sub-system 102b is configured to perform one or more measurements on the specimen 120. In this regard, the SEM inspection sub-system 102b may be configured to acquire one or more images of the specimen 120. The SEM inspection sub-system 102b may include, but is not limited to, electron beam source 128, one or more electron-optical elements 130, one or more electron-optical elements 132, and an electron detector assembly 134 including one or more electron sensors 136.

In one embodiment, the electron beam source 128 is configured to direct one or more electron beams 129 to the specimen 120. The electron beam source 128 may form an electron-optical column. In another embodiment, electron beam source 128 includes one or more additional and/or alternative electron-optical elements 130 configured to focus and/or direct the one or more electron beams 129 to the surface of the specimen 120. In another embodiment, SEM inspection sub-system 102b includes one or more electron-optical elements 132 configured to collect secondary and/or backscattered electrons 131 emanated from the surface of the specimen 120 in response to the one or more electron beams 129. It is noted herein that the one or more electron-optical elements 130 and the one or more electron-optical elements 132 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the SEM inspection sub-system 102b is not limited to the electron-optical elements depicted in FIG. 1C, which are provided merely for illustrative purposes. It is further noted that the system 100 may include any number and type of electron-optical elements necessary to direct/focus the one or more electron beams 129 onto the specimen 120 and, in response, collect and image the emanated secondary and/or backscattered electrons 131 onto the electron detector assembly 134.

For example, the system 100 may include one or more electron beam scanning elements (not shown). For instance, the one or more electron beam scanning elements may include, but are not limited to, one or more electromagnetic scanning coils or electrostatic deflectors suitable for controlling a position of the one or more electron beams 129 relative to the surface of the specimen 120. Further, the one or more scanning elements may be utilized to scan the one or more electron beams 129 across the specimen 120 in a selected pattern.

In another embodiment, secondary and/or backscattered electrons 131 are directed to one or more sensors 136 of the electron detector assembly 134. The electron detector assembly 134 of the SEM inspection sub-system 102b may include any electron detector assembly known in the art suitable for detecting backscattered and/or secondary electrons 131 emanating from the surface of the specimen 120. In one embodiment, the electron detector assembly 134 includes an electron detector array. In this regard, the electron detector assembly 134 may include an array of electron-detecting portions. Further, each electron-detecting portion of the detector array of the electron detector assembly 134 may be positioned so as to detect an electron signal from specimen 120 associated with one of the incident one or more electron beams 129. The electron detector assembly 134 may include any type of electron detector known in the art. For example, the electron detector assembly 134 may include a micro-channel plate (MCP), a PIN or p-n junction detector array, such as, but not limited to, a diode array or avalanche photo diodes (APDs). By way of another example, the electron detector assembly 134 may include a high-speed scintillator or a photomultiplier tube (PMT) detector.

While FIG. 1C illustrates the SEM inspection sub-system 102b as including an electron detector assembly 134 comprising only a secondary electron detector assembly, this is not to be regarded as a limitation of the present disclosure. In this regard, it is noted that the electron detector assembly 134 may include, but is not limited to, a secondary electron detector, a backscattered electron detector, and/or a primary electron detector (e.g., an in-column electron detector). In another embodiment, SEM inspection sub-system 102b may include a plurality of electron detector assemblies 134. For example, system 100 may include a secondary electron detector assembly 134a, a backscattered electron detector assembly 134b, and an in-column electron detector assembly 134c.

In one embodiment, the one or more processors 106 of the controller 104 are configured to analyze the output of detector assembly 126/electron detector assembly 134. In one embodiment, the set of program instructions are configured to cause the one or more processors 106 to analyze one or more characteristics of specimen 120 based on images received from the detector assembly 126/electron detector assembly 134. In another embodiment, the set of program instructions are configured to cause the one or more processors 106 to modify one or more characteristics of system 100 in order to maintain focus on the specimen 120 and/or the detector assembly 126/electron detector assembly 134. For example, the one or more processors 106 may be configured to adjust one or more characteristics of the illumination source 112/electron beam source 128 and/or other elements of system 100 in order to focus the illumination 101 and/or one or more electron beams 129 onto the surface of the specimen 120. By way of another example, the one or more processors 106 may be configured to adjust the one or more elements of system 100 in order to collect illumination and/or secondary electrons 131 from the surface of the specimen 120 and focus the collected illumination on the detector assembly 126/electron detector assembly 134. By way of another example, the one or more processors 106 may be configured to adjust one or more focusing voltages applied to one or more electrostatic deflectors of electron beam source 128 in order to independently adjust the position or alignment of the one or more electron beams 129 and scan the electron beams 129 across the specimen 120.

In another embodiment, as shown in FIGS. 1A-1C, system 100 includes a user interface 110 communicatively coupled to the controller 104. In another embodiment, the user interface 110 includes a user input device and a display. The user input device of the user interface 110 may be configured to receive one or more input commands from a user, the one or more input commands configured to input data into system 100 and/or adjust one or more characteristics of system 100. In another embodiment, the display of the user interface 110 may be configured to display data of system 100 to a user.

In one embodiment, the one or more processors 106 may be communicatively coupled to memory 108, wherein the one or more processors 106 are configured to execute a set of program instructions stored on memory 108, the set of program instructions configured to cause the one or more processors 106 to carry out various functions and steps of the present disclosure. In this regard, the controller 104 may be configured to: receive one or more training images 125 of one or more defects of the specimen 120 from the inspection sub-system 102; generate a machine learning classifier based on the one or more training images 125; receive one or more product images 135 of one or more defects of a specimen 120 from the inspection sub-system 102; determine one or more defect type classifications of the one or more defects with the machine learning classifier; filter the one or more product images 135 with one or more smoothing filters; perform one or more binarization processes to generate one or more binarized product images; perform one or more morphological image processing operations on the one or more binarized product images; determine one or more algorithm-estimated defect sizes of the one or more defects based on the one or more binarized product images; and determine one or more refined estimates of one or more defect sizes of the one or more defects based on the one or more algorithm-estimated defect sizes and the one or more defect type classifications. Each of these steps/functions of the controller 104 will each be described in further detail herein.

Figure 2:
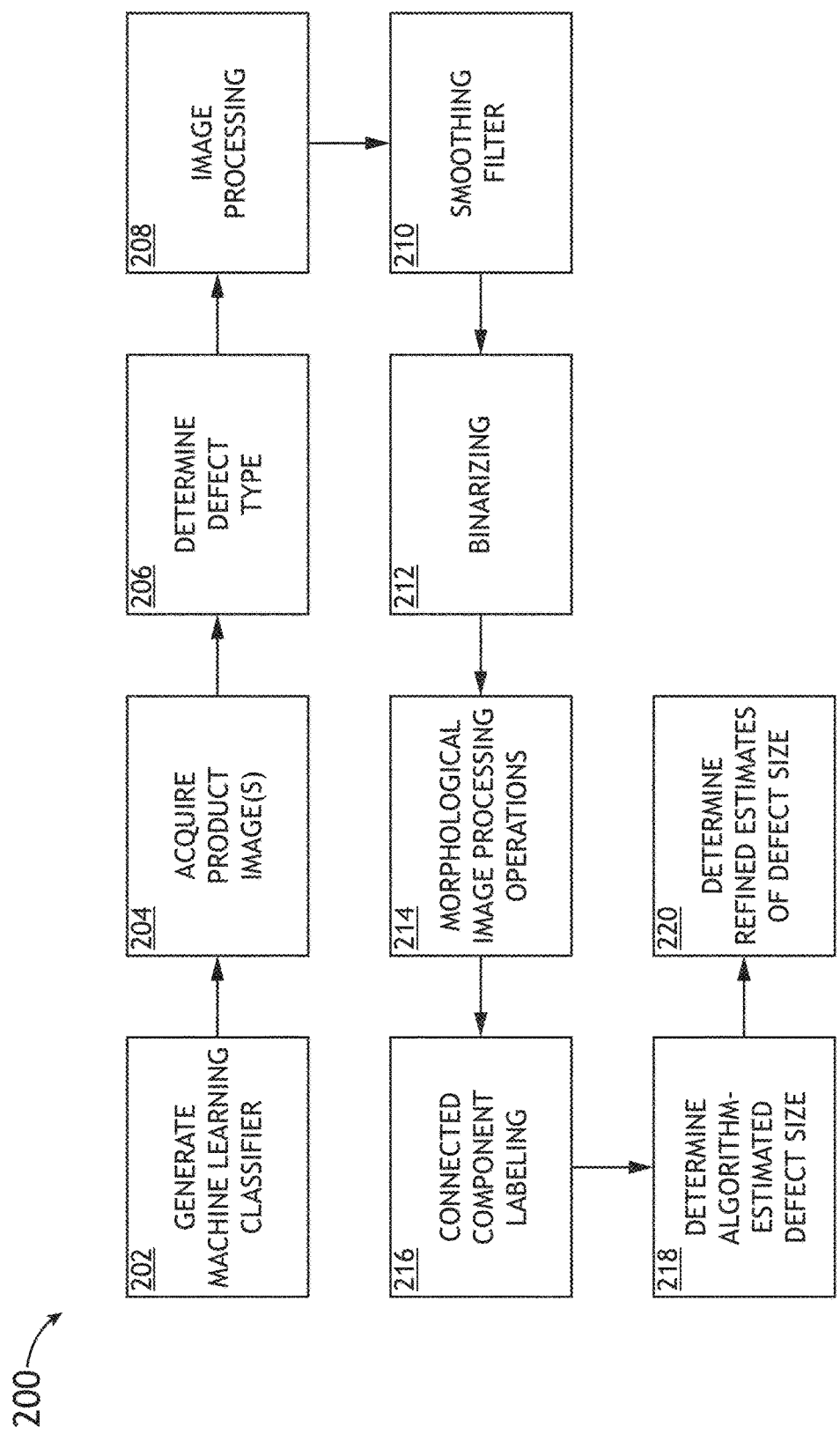
FIG. 2 illustrates a flowchart for characterizing a specimen, in accordance with one or more embodiments of the present disclosure.

FIG. 2 illustrates a flowchart 200 for characterizing a specimen 120, in accordance with one or more embodiments of the present disclosure. In particular, FIG. 2 illustrates a flowchart 200 for determining the type and size of defects using image processing and machine learning techniques. In this regard, flowchart 200 may be considered as a conceptual flowchart illustrating steps performed by/within the one or more processors 106 of the controller 104.

In a step 202, a machine learning classifier is generated. In one embodiment, the controller 104 may generate a machine learning classifier which may be used to identify types of defects within images of a specimen 120. In generating the machine learning classifier, the controller 104 may be configured to acquire one or more training images 125 of a specimen 120. For example, in one embodiment, the controller 104 may be configured to receive one or more training images 125 of one or more defects of a specimen 120 from the inspection sub-system 102. For the purposes of the present disclosure, the term "training images" may be regarded as images of defects whose type and size are known/designed/measured and that will be used as inputs to train a machine learning classifier.

For example, as shown in FIG. 1B, the controller 104 may be configured to receive one or more optical training images 125 of one or more defects of the specimen 120 from the optical inspection sub-system 102a. By way of another example, as shown in FIG. 1C, the controller 104 may be configured to receive one or more SEM training images 125 of the one or more defects of the specimen 120 from the SEM inspection sub-system 102b. In this regard, the training images 125 may include an optical training image 125, an SEM training image 125, and the like. In additional and/or alternative embodiments, the controller 104 may be configured to receive one or more training images 125 from a source other than the one or more inspection sub-systems 102. For example, the controller 104 may be configured to receive one or more training images 125 of features of a specimen 120 from an external storage device and/or memory 108. In another embodiment, controller 104 may be further configured to store received training images 125 in memory 108.

In another embodiment, the controller 104 may be configured to generate a machine learning classifier based on the one or more received training images 125. The controller 104 may be configured to generate the machine learning classifier via any techniques known in the art including, but not limited to, supervised learning, unsupervised learning, and the like.

For example, in the context of supervised learning, training images 125 may include images of defects with known sizes and/or known defect types. In this regard, the controller 104 may receive one or more known defect type classifications and/or one or more known defect sizes associated with the defects depicted in the training images 125. Accordingly, the training images 125, known defect type classifications, and known defect sizes may be used as inputs to train the machine learning classifier. Known defect type classifications may include classifications for any type of defect known in the art including, but not limited to, a pin-hole defect classification, a resist-dot defect classification, a scratch defect classification, a fast-localized defect classification, and the like. The controller 104 may be further configured to store known defect type classifications, known defect sizes, and the generated machine learning classifier in memory 108.

It is further noted herein that the machine learning classifier generated in step 202 may include any type of machine learning algorithm/classifier and/or deep learning technique or classifier known in the art including, but not limited to, a random forest classifier, a support vector machine (SVM) classifier, an ensemble learning classifier, an artificial neural network (ANN), and the like. By way of another example, the machine learning classifier may include a deep convolutional neural network. For instance, in some embodiments, the machine learning classifier may include ALEXNET and/or GOOGLENET. In this regard, the machine learning classifier may include any algorithm, classifier, or predictive model configured to determine types of defects within images of a specimen 120. This will be discussed in further detail herein.

In a step 204, one or more product images are acquired. In one embodiment, the controller 104 may be configured to receive one or more product images 135 from the inspection sub-system 102. As it is used herein, the term "product images" may be used to refer to images of defects for which the type of defect and size of defect is to be determined. Thus, "product images" may be distinguished from "training images," which may be regarded as images of defects which will be used as inputs to train a machine learning classifier.

It is noted herein that any discussion regarding the acquisition of training images 125 may be regarded as applying to the acquisition of product images 135, unless noted otherwise herein. Accordingly, the product images 135 may be received from the optical inspection sub-system 102a and/or the SEM inspection sub-system 102b. In this regard, the product images 135 may include an optical product image 135, an SEM product image 135, and the like. In additional and/or alternative embodiments, the controller 104 may be configured to receive one or more product images 135 from a source other than the one or more inspection sub-systems 102. For example, the controller 104 may be configured to receive one or more product images 135 of a specimen 120 from an external storage device and/or memory 108.

Figure 3:
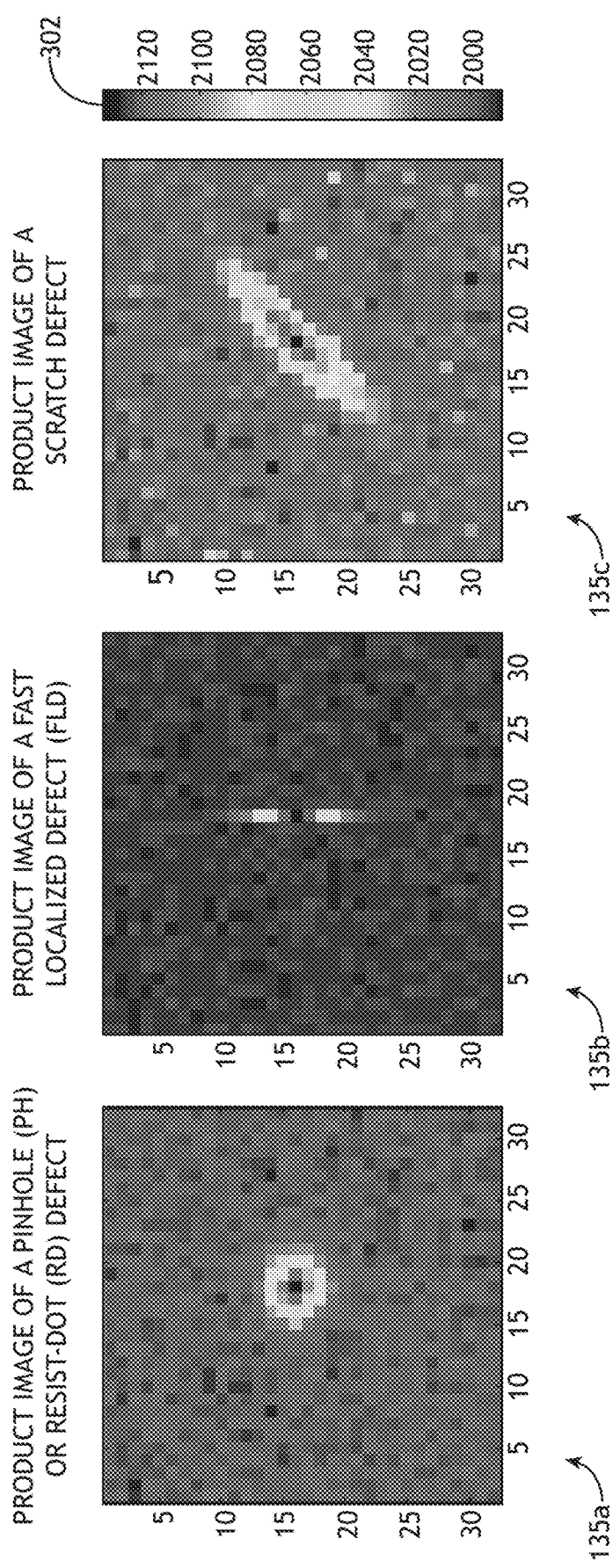
FIG. 3 illustrates product images of various types of defects, in accordance with one or more embodiments of the present disclosure.

FIG. 3 illustrates product images 135 of various types of defects, in accordance with one or more embodiments of the present disclosure. In particular, FIG. 3 illustrates product images 135a-135c of various types of defects captured by a dark-field inspection tool (e.g., inspection sub-system 102).

In embodiments, product image 135a illustrates a pin-hole (PH) defect or resist-dot (RD) defect, product image 135b illustrates a fast-localized defect (FLD), and product image 135c illustrates a scratch defect. As may be seen in FIG. 3, images captured by a dark-field inspection tool (e.g., inspection sub-system 102) may be sized 32×32 pixels. FIG. 3 further illustrates a scale 302 which associates brighter pixels with the respective defect.

In embodiments, the one or more product images 135 used to determine the size and/or type of defects of the specimen 120 may be acquired during inspection and/or post inspection. In another embodiment, controller 104 may be further configured to store received product images 135 in memory 108.

In a step 206, one or more defect types of the one or more defects of the specimen 120 are determined. The one or more defects of the specimen 120 may include any type of defect which may be of interest throughout a specimen 120 fabrication/characterization process including, but not limited to, a pin-hole defect, a resist-dot defect, a scratch, a fast-localized defect, and the like. In some embodiments, the controller 104 is configured to determine one or more defect type classifications of the one or more defects within a product image 135 with the generated machine learning classifier. For example, the controller 104 may receive product image 135a depicting a pin-hole defect of the specimen 120. In this example, the controller 104 may be configured to determine the product image 135a includes a pin-hole defect, and associate the defect with a pin-hole defect type classification. By way of another example, the controller 104 may receive product image 135c depicting a scratch defect of the specimen 120, determine the product image 135c includes a scratch defect, and associate the defect with a scratch defect type classification.

In a step 208, one or more image processing operations are performed on the one or more product images 135. In one embodiment, the controller 104 is configured to perform one or more image processing operations on the one or more product images 135.

For example, in the context of a darkfield inspection tool (e.g., inspection sub-system 102), the one or more product images 135 may include images of defects on the specimen 120 which are grayscale and are sized 32×32 pixels (as shown in FIG. 2). This relatively small image size may lead to large variations in estimated defect sizes. Accordingly, in some embodiments, the one or more image processing operations may include image scaling operations configured to adjust a size of the product images 135. During an image scaling operation (e.g., image processing operation), the controller 104 may be configured to adjust a size of the one or more product images 135 with an image scaling operation to generate one or more scaled product images. For instance, with 32×32 pixel images, the controller 104 may be configured to perform an image upscaling operation (e.g., image processing operation) in order to upscale the product images 135 by a factor of eight to generate scaled product images with a size of 256×256 pixels. It is noted herein that the image scaling operations may include upscaling and/or downscaling operations configured to upscale and/or downscale the product images by any selected factor.

Image upscaling may result in scaled product images which have blurred boundaries around the defects. In order to reduce and/or eliminate these variations and blurred boundaries, the one or more image processing operations may further include one or more image sharpening operations. For example, after performing an image upscaling operation to generate scaled product images with a size of 256×256 pixels, the controller may be configured to alter the one or more scaled product images with one or more image sharpening operations. The product images 135 and/or scaled product images may be altered via image sharpening operations using any techniques known in the art. For instance, the controller 104 may be configured to sharpen scaled product images using image filtering operation performed using a Laplacian filter. In this regard, image sharpening operations may include one or more image filtering operations.

Figure 4:
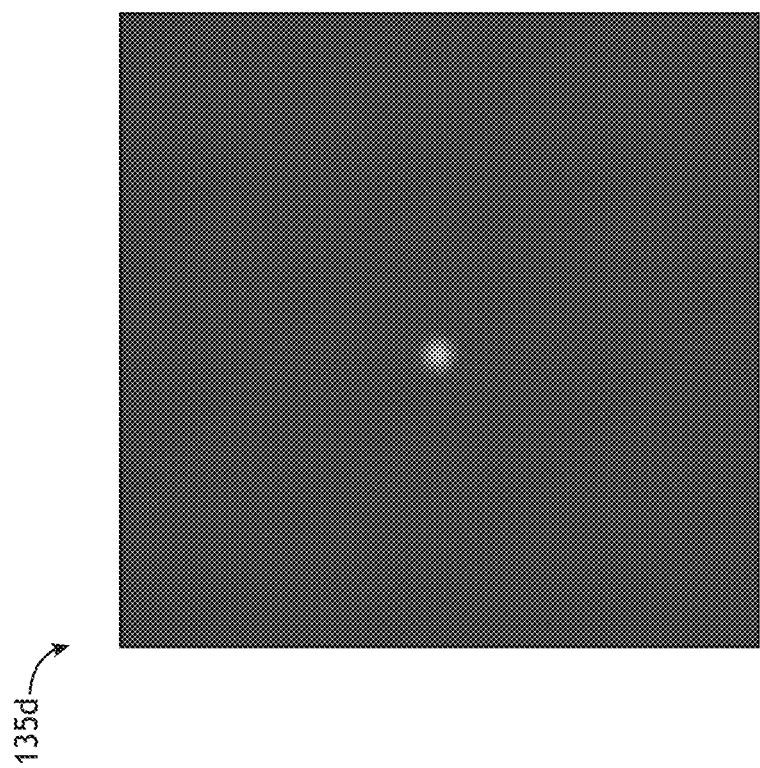
FIG. 4 illustrates a review image of a defect, in accordance with one or more embodiments of the present disclosure.

By way of another example, in the context of review images captured by a review tool (e.g., inspection sub-system 102), the one or more product images 135 may include images of defects on the specimen 120 which are in color and are sized 512×512 pixels. For example, FIG. 4 illustrates a review image 135d of a defect, in accordance with one or more embodiments of the present disclosure. In particular, FIG. 4 illustrates a product image 135d of a defect captured by an optical review tool (e.g., inspection sub-system 102), with brighter pixels representing the defect. As noted previously, the product image 135d may be in color and sized 512×512 pixels.

In the context of review images captured by a review tool (e.g., product image 135d), the one or more image processing operations carried out by the controller 104 may include converting the one or more product images 135 from a first color space system to a second color space system. Color space systems may include any color space system known in the art including, but not limited to, a red-green-blue (RGB) color space system, and a hue-saturation-value (HSV) color space system. For instance, the product image 135d may be captured in an RGB color space system, and the controller 104 may be configured to convert the product image 135d into an HSV color space system. It is noted herein that the value channel of an HSV color space system may provide an improved intensity profile, and more consistent distinction of the defect pixels as compared to an RGB color space system.

It is further noted herein that the one or more image processing operations may include any image processing operations known in the art. In this regard, exemplary image processing operations are provided solely for illustrative purposes, and are not to be regarded as a limitation of the present disclosure, unless noted otherwise herein.

In a step 210, the one or more product images 135 are filtered with one or more smoothing filters. In order to reduce noise in regions around the defects within the one or more product images 135, the controller 104 may be configured to filter the one or more product images 135 with one or more smoothing filters. The one or more smoothing filters may include any smoothing filters known in the art including, but not limited to, a mean filter, a Laplacian filter, a Weiner filter, a Gaussian filter, a minimum/maximum filter, a median filter, a midpoint filter, and the like. For example, the controller 104 may be configured to smooth one or more product images 135 by convolving using a Gaussian kernel.

In a step 212, one or more binarization processes are performed to generate one or more binarized product images. In one embodiment, the controller 104 is configured to perform one or more binarization processes on the product images 135 in order to generate one or more binarized product images. Through binarization, pixels associated with defects (e.g., defect pixels) in the product images 135 may be identified from background pixels of the product images 135 using one or more binarization formulas. For example, defect pixels may be identified from the background pixels using the binarization formula given by Equation 1:

$$b(x, y) = \begin{cases} 1, & (\mu - w*(\sigma + \delta)) < I(x, y) < (\mu + w*(\sigma + \delta)) \\ 0, & \text{otherwise} \end{cases} \quad (1)$$

where $\mu$ defines the mean value of the background pixels' graylevel, $\sigma$ defines the standard deviation value of the background pixels graylevel, w defines a user provided weight (e.g., 3), $\delta$ defines an user provided offset (e.g., 0.1), I defines the graylevel of the respective product image 135 at pixel location (x, y) (e.g., product image 135 filtered using one or more smoothing filters in step 210), and b(x, y) defines the binarized image at pixel location (x, y). The step of converting a processed graylevel image using Equation 1 into an image with only two values—the defect pixels with graylevel 1 and remaining pixels with graylevel 0—may be referred to as binarization. In another embodiment, the controller 104 may be configured to store the one or more binarized product images in memory 108.

Following binarization, a defect within a product image 135 may appear to be brighter in the middle of the defect with a dark outline around the middle of the defect. This may be due to the optical properties of the defect and/or specimen 120. In these cases, these two regions (e.g., bright center region, darker outline) may appear to be disconnected following binarization in step 212. Subsequently selecting only one of the regions as representing the defect may underestimate the defect size. For example, by selecting only the bright center region, the defect size may be underestimated. In order to bridge the gap between such disconnected regions, morphological image processing operations may be performed.

In a step 214, one or more morphological image processing operations are performed. For example, in embodiments, the controller 104 may be configured to perform one or more morphological image processing operations on the one or more product images 135 and/or one or more binarized product images. The one or more morphological image processing operations may include any morphological image processing operations known in the art including, but not limited to, a morphological closing operation (e.g., morphological binary image closing operation), a morphological erosion operation, a morphological dilation operation, a morphological opening operation, a morphological closing operation, and the like. As noted previously herein, morphological image processing operations may be performed in order to bridge the gaps between disconnected regions of a defect resulting from binarization.

In a step 216, connected component labeling is performed. After performing binarization operations and morphological image processing operations, noise and other factors may cause small clusters of pixels to be incorrectly labeled as defective (e.g., part of a defect) in addition to the pixel cluster corresponding to the defect. In this regard, connected component labeling may be performed in order to label and select only the pixel cluster corresponding to the defect. Accordingly, the controller 104 may be configured to perform connected component labeling by identifying and labeling each isolated pixel cluster within the binarized product images with a unique label. Due to the fact that pixel clusters attributable to noise are generally smaller than the pixel cluster corresponding to the defect, the controller 104 may be configured to identify and label one or more pixel clusters as corresponding to, or being associated with, a single defect.

For example, the controller 104 may be configured to identify a plurality of pixel clusters within the one or more binarized product images, and determine the largest pixel cluster of the plurality of pixel clusters as being associated with the one or more defects. The controller 104 may then be further configured to disregard (e.g., ignore) other pixel clusters as being attributable to noise.

In a step 218, algorithm-estimated defect sizes are determined for the one or more defects. In one embodiment, the controller 104 may be configured to determine one or more algorithm-estimated defect sizes of the one or more defects based on the one or more binarized product images. Characteristics of the binarized product images which are used to determine algorithm-estimated defect sizes may include, but are not limited to, identified/labeled pixel clusters, maximum defect pixel graylevel values, minimum defect pixel graylevel values, and the like.

For example, after identifying a pixel cluster within a binarized product image as being associated with a defect, the controller 104 may be configured to determine an algorithm-estimated defect size of the defect based on the identified pixel cluster. As it is used herein, the term "algorithm-estimated defect size" may refer to the estimated size of the defect based on the number of pixels determined to be associated with the defect within a product image 135 (e.g., binarized product image 135) and/or other characteristics of the product image 135. In this regard, "algorithm-estimated defect size" may be distinguished from "refined estimates of defect size," as will be discussed in further detail herein.

It is contemplated herein that estimating the size of a defect based solely on pixels of an image (e.g., algorithm-estimated defect size) may introduce a certain amount of error into defect size determinations. For example, due to differences in optical properties of the respective defect types, a pin-hole defect and a resist-dot defect may be determined to have the same algorithm-estimated defect size, even if the size of the two defects actually varies substantially in reality. This may be further understood with reference to FIG. 5.

Figure 5:
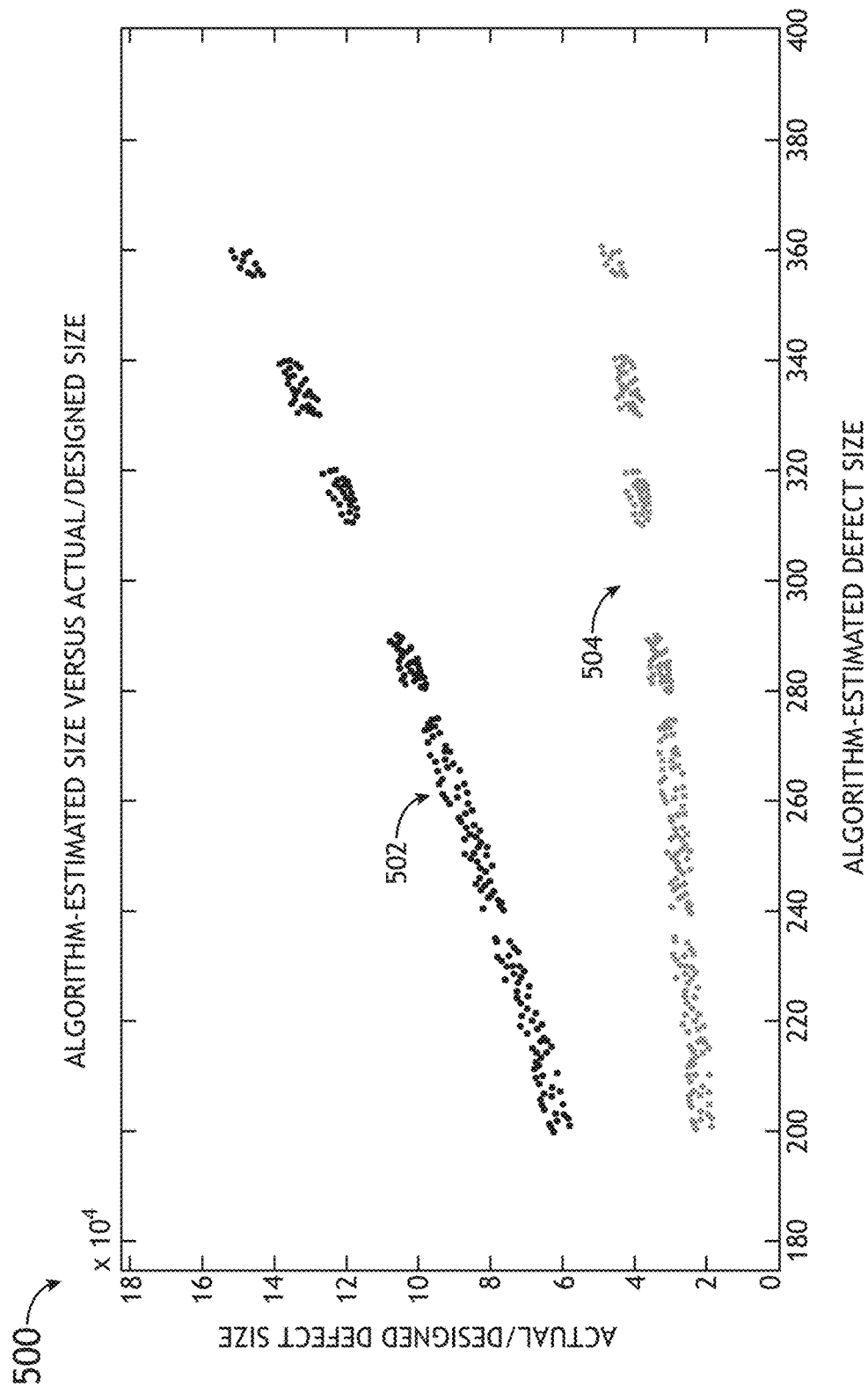
FIG. 5 is a graph illustrating relationships between algorithm-estimated defect size and refined estimates of defect size for pin-hole (PH) defects and resist dot (RD) defects, in accordance with one or more embodiments of the present disclosure.

FIG. 5 is a graph 500 illustrating relationships between algorithm-estimated defect size and actual/designed defect size for pin-hole (PH) defects and resist dot (RD) defects, in accordance with one or more embodiments of the present disclosure. Graph 500 illustrates the relationship between actual and/or designed defect size, and algorithm-estimated defect size. Curve 502 illustrates the relationship between actual/designed defect size and algorithm-estimated defect size for resist-dot (RD) defects, and curve 504 illustrates the relationship between actual/designed defect size and algorithm-estimated defect size for pin-hole (PH) defects.

As may be seen in graph 500, when algorithm-estimated defect size is plotted as a function of actual/designed defect size, distinct and independent trends are revealed corresponding to various defect types (e.g., curve 502 for RD defects, curve 504 for PH defects). In some embodiments, graphs plotting algorithm-estimated defect size against actual/designed defect size (e.g., graph 500) may be constructed during supervised training of the machine learning classifier (step 202) via training images 125. Upon construction of a graph 500, distinct mathematical models/functions (e.g., polynomial functions) may be generated to fit to each of the curves 502, 504. For example, during the supervised learning using training images 125 depicting defects with known defect sizes and/or known defect types, the controller 104 may be configured to generate mathematical models/functions (e.g., polynomial functions) which correlate algorithm-estimated defect sizes to actual/designed defect sizes for various types of defects. For instance, the controller 104 may be configured to generate a first mathematical model (e.g., mathematical function, polynomial function) which correlates algorithm-estimated defect sizes to actual/designed defect sizes for RD defects, and a second mathematical model (e.g., mathematical function, polynomial function) which correlates algorithm-estimated defect sizes to actual/designed defect sizes for PH defects. Generated mathematical models may be stored in memory 108. In this regard, the controller 104 may be configured to generate mathematical models/functions modeling curves 502 and 504 during supervised learning.

As shown in FIG. 5, a single algorithm-estimated defect size may be indicative of varying actual/designed defect sizes, dependent upon the type of defect at issue. In this regard, it may be appreciated that algorithm-estimated defect size is not sufficient, on its own, to accurately determine the size of defects.

Accordingly, previous approaches which attempt to determine defect size based only on pixel clusters within images may be unable to accurately determine the size of defects within 15-20% of the actual defect size. Comparatively, embodiments of the present disclosure are configured to utilize both algorithm-estimated defect size and determined defect type classifications in order to more accurately determine refined estimates of defect sizes. More particularly, embodiments of the present disclosure are configured to utilize both algorithm-estimated defect size, mathematical models/functions correlating the algorithm-estimated defect sizes to actual/designed defect sizes, and models determining defect type classifications (e.g., random forest classifier model, deep convolutional neural network model and such) in order to more accurately determine refined estimates of defect sizes.

In a step 220, refined estimates of defect sizes are determined. In one embodiment, the controller 104 may be configured to determine one or more refined estimates of one or more defect sizes (e.g., estimates of true/actual defect sizes) of the one or more defects based on the one or more algorithm-estimated defect sizes (step 218) and the one or more defect type classifications (step 206). For instance, the controller 104 may be configured to determine one or more refined estimates of one or more defect sizes (e.g., estimates of true/actual defect sizes) of the one or more defects based on the one or more algorithm-estimated defect sizes (step 218), the one or more defect type classifications (step 206), and one or more mathematical models correlating algorithm-estimated defect sizes to actual/designed defect sizes for various types of defects.

An example may prove to be illustrative. A machine learning classifier may be trained/calibrated using supervised learning techniques. During the supervised learning utilizing training images 125, known defect sizes, and known defect types, the controller 104 may be configured to generate mathematical models/functions (e.g., polynomial functions) which correlate algorithm-estimated defect sizes to actual/designed defect sizes for various types of defects (e.g., mathematical functions modeling curves 502, 504). For instance, during calibration/training, the controller 104 may generate a first polynomial function (e.g., first mathematical model) associated with curve 502, and a second polynomial function (e.g., a second mathematical model) associated with curve 504. The polynomial functions (e.g., first mathematical model, second mathematical model) may be stored in memory 108.

Continuing with the same example, the controller 104 may be configured to acquire a product image 135a of a defect. Using the trained machine learning classifier, the controller 104 may determine the defect pictured in product image 135a is a pin-hole defect, and may therefore associate a pin-hole defect classification with the defect. Subsequently, after performing various steps of flowchart 200, the controller 104 may subsequently determine an algorithm-estimated defect size of the defect using the second polynomial function (e.g., second mathematical model modeling to curve 504 for pin-hole defects). Using the determined pin-hole defect classification, the second polynomial function, and the algorithm-estimated defect size, the controller 104 may then be configured to determine a refined estimate of a defect size estimating the true/actual size of the defect.

It is contemplated herein that using both algorithm-estimated defect sizes (along with generated mathematical models generated during training that correlate the algorithm-estimated defect size and the actual/designed defect sizes) and determined defect type classifications may enable the system and method of the present disclosure to accurately estimate sizes of defects within 15-20% of actual defect sizes for a wide range of defect types and sizes (e.g., refined estimates of defect sizes within 15-20% of the actual defect size).

Figure 6:
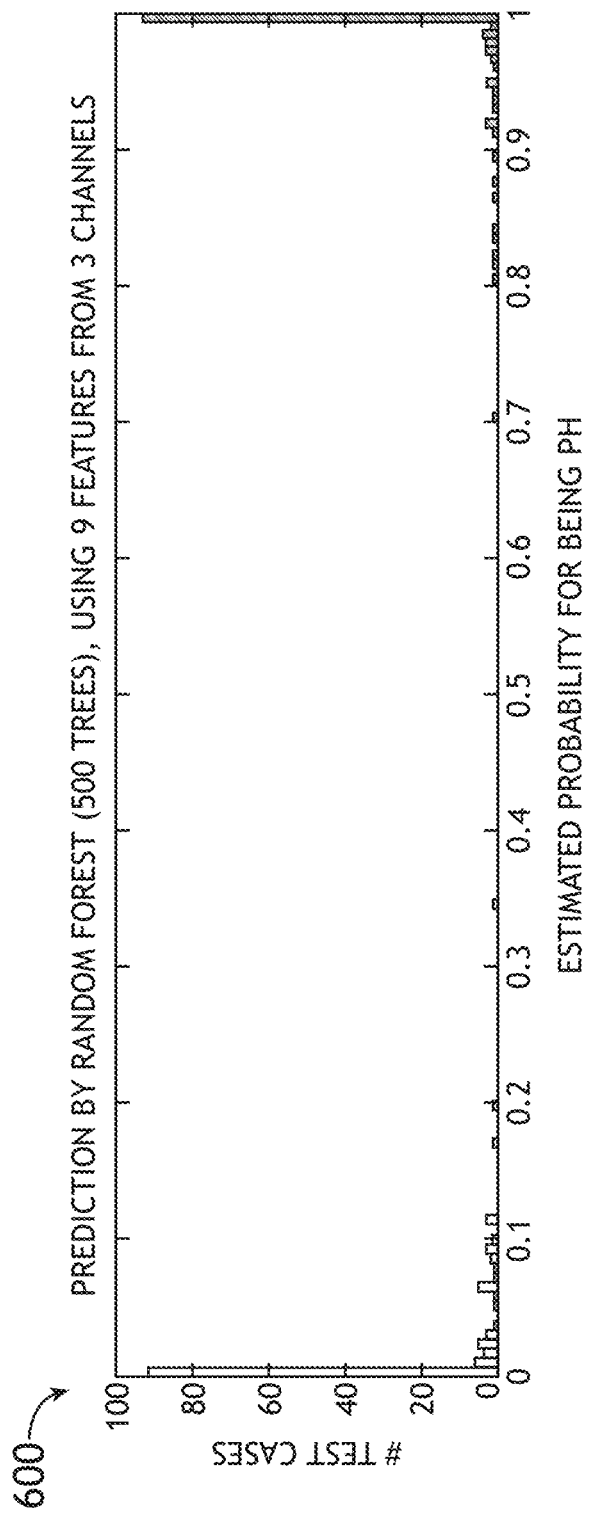
FIG. 6 shows a graph illustrating the classification of defects with a random forest classifier, in accordance with one or more embodiments of the present disclosure.
Figure 7:
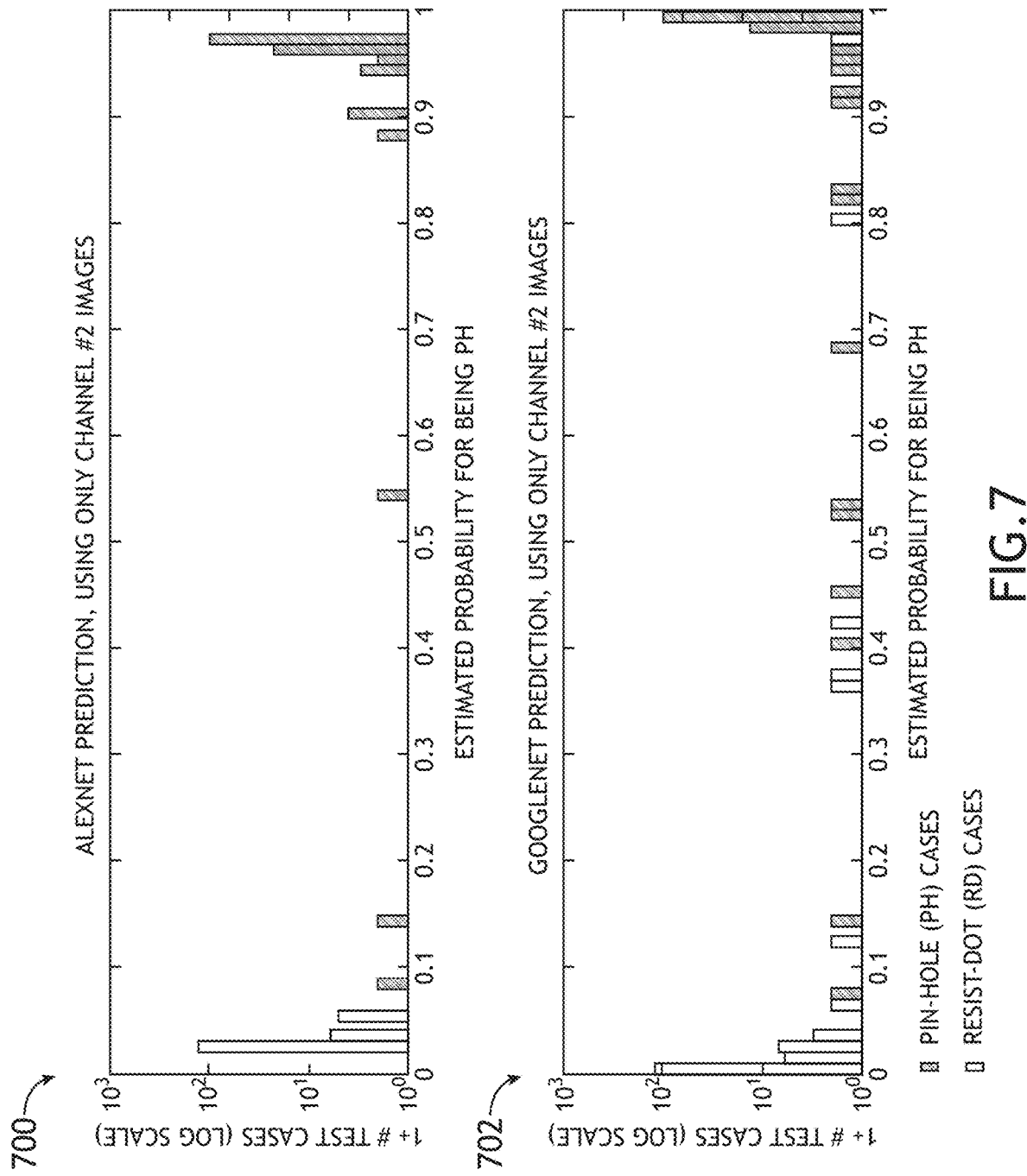
FIG. 7 shows graphs illustrating the classification of defects with deep neural networks, in accordance with one or more embodiments of the present disclosure.

The effectiveness of determining defect type classifications using various types of machine learning classifiers may be further understood with reference to FIGS. 6 and 7.

FIG. 6 shows a graph 600 illustrating the classification of defects with a random forest classifier, in accordance with one or more embodiments of the present disclosure. FIG. 7 shows graphs 700, 702 illustrating the classification of defects with deep neural networks, in accordance with one or more embodiments of the present disclosure.

In the case of a random forest classifier (e.g., machine learning classifier), the controller 104 may be configured to generate a three-dimensional (3D) feature vector based on the features that include algorithm-estimated defect size, the minimum defect pixel graylevel value, and the maximum defect pixel graylevel value within a binarized product image. The features are chosen to be representative of different defect types and are not exhaustive. In a particular embodiment, three distinct product images 135 (e.g., binarized product images) may be utilized for each defect, resulting in a total of nine features. As a result, a random forest classifier using nine features may provide a defect type classification with an accuracy of approximately 100% on the test data (e.g., test defects), as may be seen in graph 600.

Comparatively, graphs 700 and 702 illustrate the classification of defects using a deep neural network trained with original product images 135. In particular, graph 700 illustrates the classification of defects with ALEXNET, and graph 702 illustrates the classification of defects with GOOGLENET.

In some embodiments, the controller 104 may be further configured to generate control signals based on at least one of a refined estimate of a defect size or a determined defect type classification, where the one or more control signals are configured to selectively adjust one or more characteristics of one or more process tools. For example, referring to FIGS. 1A-1C, the system 100 may further include one or more fabrication tools communicatively coupled to the controller 104. The one or more fabrication tools may include any fabrication tool known in the art configured to fabricate a specimen 120 including, but not limited to, a lithography tool, an etching tool, a deposition tool, a polishing tool, and the like. Continuing with the same example, the controller 104 may be configured to generate one or more control signals configured to adjust one or more characteristics of one or more fabrication tools in a feed-forward or a feed-back loop in order to correct at least one of a refined estimate of a defect size or a determined defect type classification.

It is contemplated herein that the system and method of the present disclosure may enable more accurate defect type and size determinations for a wide range of defect sizes (e.g., smaller than 80 nm, greater than 200 nm). In particular, the system and method of the present disclosure may enable estimation of defect size to within 15-20% of the actual defect size (e.g., refined estimates of defect sizes within 15-20% of the actual defect size).

It is noted herein that the one or more components of system 100 may be communicatively coupled to the various other components of system 100 in any manner known in the art. For example, the one or more processors 106 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 104 may be communicatively coupled to one or more components of inspection sub-system 102 via any wireline or wireless connection known in the art.

In one embodiment, the one or more processors 106 may include any one or more processing elements known in the art. In this sense, the one or more processors 106 may include any microprocessor-type device configured to execute software algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 106. In general, the term "processor" may be broadly defined to encompass any device having one or more processing elements, which execute program instructions from memory 108. Moreover, different subsystems of the system 100 (e.g., illumination source 112, electron beam source 128, detector assembly 126, electron detector assembly 134, controller 104, user interface 110, and the like) may include processor or logic elements suitable for carrying out at least a portion of the steps described throughout the present disclosure. Therefore, the above description should not be interpreted as a limitation on the present disclosure but merely an illustration.

The memory 108 may include any storage medium known in the art suitable for storing program instructions executable by the associated one or more processors 106 and the data received from the inspection sub-system 102. For example, the memory 108 may include a non-transitory memory medium. For instance, the memory 108 may include, but is not limited to, a read-only memory (ROM), a random-access memory (RAM), a magnetic or optical memory device (e.g., disk), a magnetic tape, a solid-state drive and the like. It is further noted that memory 108 may be housed in a common controller housing with the one or more processors 106. In an alternative embodiment, the memory 108 may be located remotely with respect to the physical location of the processors 106, controller 104, and the like. In another embodiment, the memory 108 maintains program instructions for causing the one or more processors 106 to carry out the various steps described through the present disclosure.

In one embodiment, a user interface 110 is communicatively coupled to the controller 104. In one embodiment, the user interface 110 may include, but is not limited to, one or more desktops, tablets, smartphones, smart watches, or the like. In another embodiment, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110.

Figure 8A:
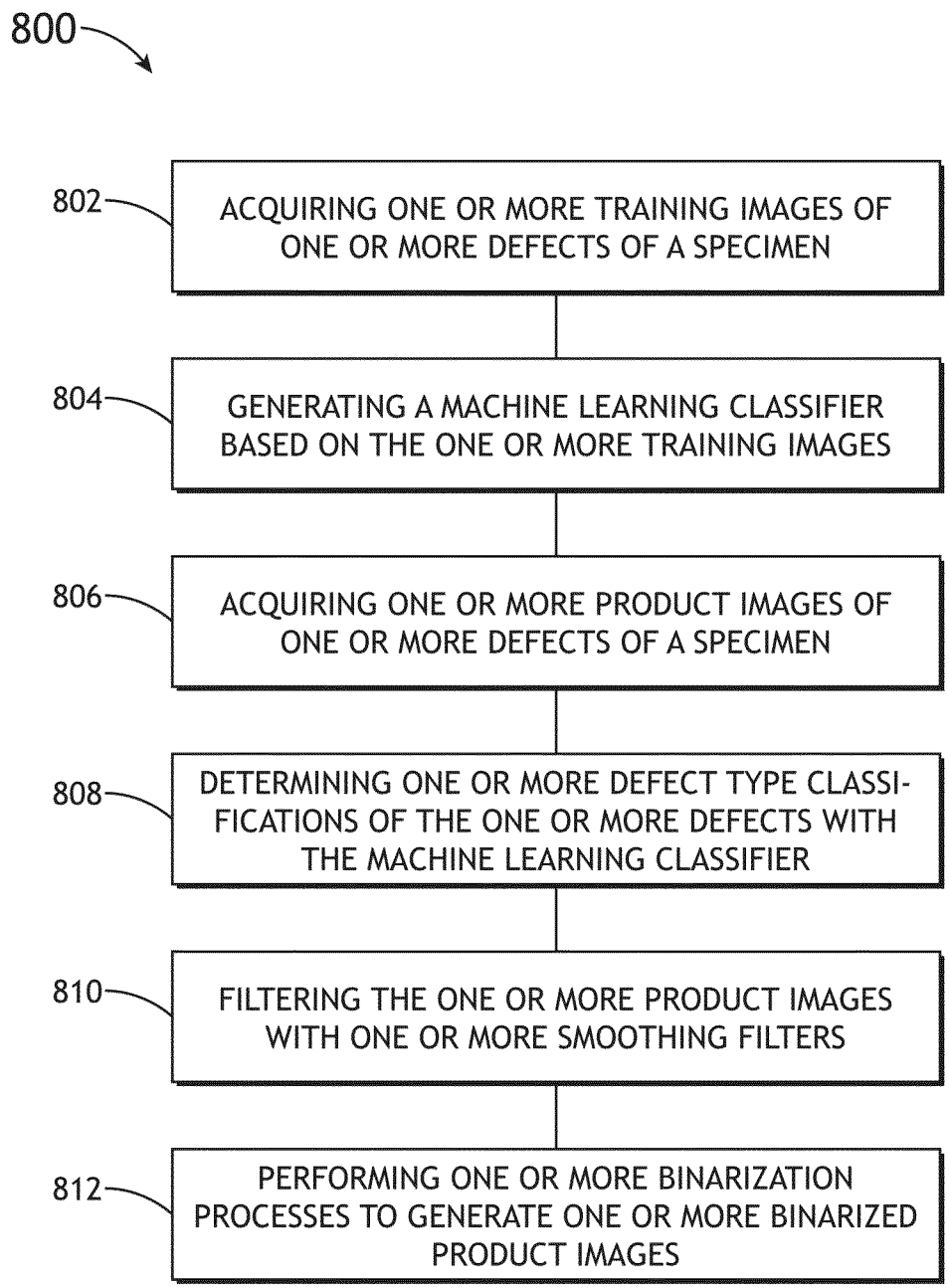
FIG. 8A illustrates a flowchart of a portion of a method for characterizing a specimen, in accordance with one or more embodiments of the present disclosure.
Figure 8B:
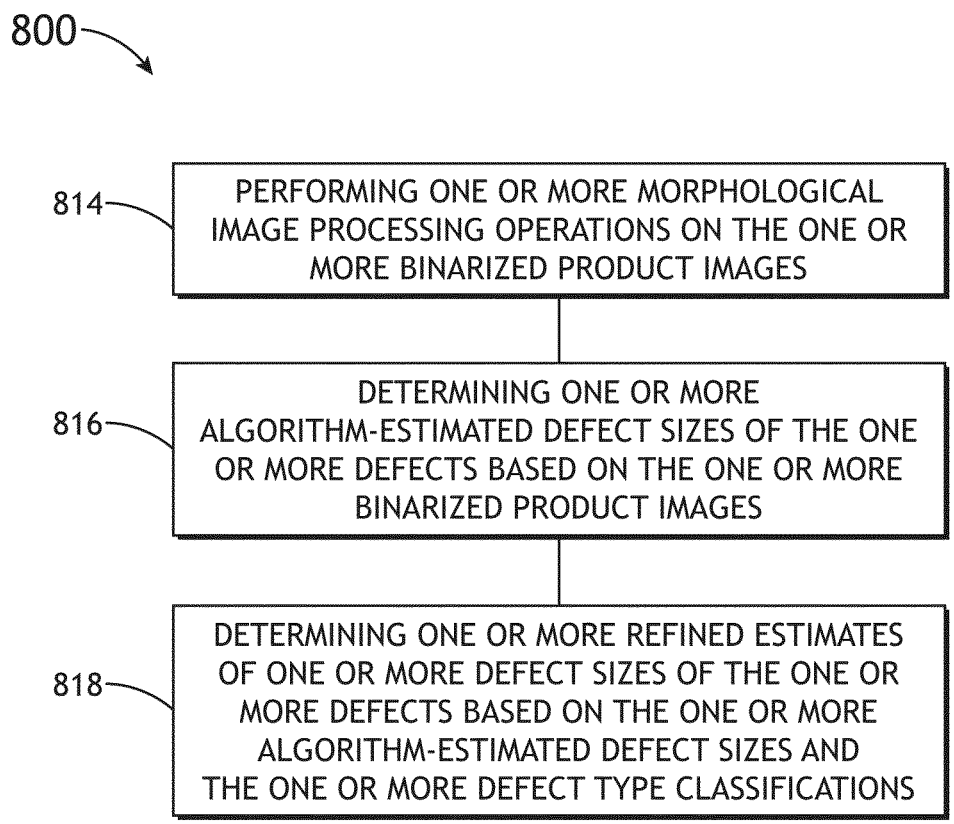
FIG. 8B illustrates a flowchart of a portion of a method for characterizing a specimen, in accordance with one or more embodiments of the present disclosure.

FIGS. 8A-8B illustrate a flowchart of a method 800 for characterizing a specimen 120, in accordance with one or more embodiments of the present disclosure. In particular, FIGS. 8A-8B illustrate a method 800 for determining type and size of defects of a specimen 120 using machine learning techniques. It is noted herein that the steps of method 800 may be implemented all or in part by system 100. It is further recognized, however, that the method 800 is not limited to the system 100 in that additional or alternative system-level embodiments may carry out all or part of the steps of method 800.

In a step 802, one or more training images of one or more defects of a specimen are acquired. For example, as shown in FIG. 1B, the controller 104 may be configured to receive one or more optical training images 125 of one or more features of the specimen 120 from the optical inspection sub-system 102a. By way of another example, as shown in FIG. 1C, the controller 104 may be configured to receive one or more SEM training images 125 of the one or more features of the specimen 120 from the SEM inspection sub-system 102b. The one or more training images include a set of patch images for defects ranging from 80 to 200 nm and a set of review images for defects larger than 200 nm.

In a step 804, a machine learning classifier is generated based on the one or more training images. For example, using supervised learning, the one or more training images 125 and known defect sizes and/or known defect types may be used as inputs to train the machine learning classifier. The machine learning classifier may include any type of machine learning algorithm/classifier and/or deep learning technique or classifier known in the art including, but not limited to, a random forest classifier, a support vector machine (SVM) classifier, an ensemble learning classifier, an artificial neural network (ANN), a deep neural network or convolutional neural network (e.g., ALEXNET, GOOGLENET), and the like.

In a step 806, one or more product images of one or more defects of a specimen are acquired. For example, as shown in FIG. 1B, the controller 104 may be configured to receive one or more optical product images 135 of one or more features of the specimen 120 from the optical inspection sub-system 102a. By way of another example, as shown in FIG. 1C, the controller 104 may be configured to receive one or more SEM product images 135 of the one or more features of the specimen 120 from the SEM inspection sub-system 102b.

In a step 808, one or more defect type classifications of the one or more defects are determined with the machine learning classifier. For example, the controller 104 may receive product image 135a depicting a pin-hole defect of the specimen 120. In this example, the controller 104 may be configured to determine the product image 135a includes a pin-hole defect, and associate the defect with a pin-hole defect classification. By way of another example, the controller 104 may receive product image 135c depicting a scratch defect of the specimen 120, determine the product image 135c includes a scratch defect, and associate the defect with a scratch defect classification.

In a step 810, the one or more product images are filtered with one or more smoothing filters. The one or more smoothing filters may include any smoothing filters known in the art including, but not limited to, a mean filter, a Laplacian filter, a Weiner filter, a Gaussian filter, a minimum/maximum filter, a median filter, a midpoint filter, and the like. For example, the controller 104 may be configured to smooth one or more product images 135 by convolving using a Gaussian kernel.

In a step 812, one or more binarization processes are performed to generate one or more binarized product images. For example, the controller 104 may be configured to perform one or more binarization processes on the product images 135 in order to generate one or more binarized product images. Through binarization, pixels associated with defects (e.g., defect pixels) in the product images 135 may be identified from background pixels of the product images 135 using one or more binarization formulas.

In a step 814, one or more morphological image processing operations are performed on the one or more binarized product images. For example, in embodiments, the controller 104 may be configured to perform one or more morphological image processing operations on the one or more product images 135 and/or one or more binarized product images. The one or more morphological image processing operations may include any morphological image processing operations known in the art including, but not limited to, a morphological closing operation (e.g., morphological binary image closing operation), a morphological erosion operation, a morphological dilation operation, a morphological opening operation, a morphological closing operation, and the like. As noted previously herein, morphological image processing operations may be performed in order to bridge the gaps between disconnected regions of a defect resulting from binarization.

In a step 816, one or more algorithm-estimated defect sizes of the one or more defects are determined based on the one or more binarized product images. For example, the controller 104 may be configured to determine one or more algorithm-estimated defect sizes of the one or more defects based on the one or more binarized product images. Characteristics of the binarized product images which are used to determine algorithm-estimated defect sizes may include, but are not limited to, identified/labeled pixel clusters, maximum defect pixel graylevel values, minimum defect pixel graylevel values, and the like.

In a step 818, one or more refined estimates of one or more defect sizes of the one or more defects are determined based on the one or more algorithm-estimated defect sizes and the one or more defect type classifications. For example, the controller 104 may be configured to generate mathematical models (e.g., polynomial functions) which correlate algorithm-estimated defect sizes to actual/designed defect sizes for various types of defects with known characteristics (e.g., via training images 125 with defects of known/designed size). Subsequently, after acquiring a product image 135, the controller 104 may be configured to determine a pin-hole defect classification associated with the defect, and determine an algorithm-estimated defect size. The controller 104 may then be configured to determine a refined estimates of a defect size of the defect based on the determined defect type classification, the generated mathematical model, and the determined algorithm-estimated defect size.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for characterizing a specimen, comprising:
   a controller including one or more processors configured to execute a set of program instructions stored in memory, the set of program instructions configured to cause the one or more processors to:
   receive one or more training images of one or more defects of the specimen, wherein the one or more training images include a set of patch images for defects ranging from 80 to 200 nm and a set of review images for defects larger than 200 nm;
   generate one or more machine learning classifiers based on the one or more training images;
   receive one or more product images of one or more defects of a specimen, wherein some of the one or more product images are patch images and some of the one or more product images are review images;
   determine one or more defect type classifications of the one or more defects with the one or more machine learning classifiers;
   filter the one or more product images with one or more smoothing filters;
   perform one or more binarization processes to generate one or more binarized product images;
   perform one or more morphological image processing operations on the one or more binarized product images;
   determine one or more defect sizes for product images having defect sizes between 80 and 200 nm using patch images and determine one or more defect sizes for product images having defect sizes above 200 nm using review images; and
   determine one or more refined estimates of one or more defect sizes of the one or more defects having a size smaller than 80 nm based on one or more algorithm-estimated defect sizes and the one or more defect type classifications.

2. The system of claim 1, wherein the one or more defect type classifications comprise at least one of a pin-hole defect classification, a resist-dot defect classification, a scratch defect classification, or a fast localized defect classification.

3. The system of claim 1, wherein receiving the one or more training images of one or more defects of the specimen comprises:
   receiving the one or more training images of the one or more defects of the specimen; and
   receiving at least one of a known defect type classification or a known defect size associated with the one or more defects.

4. The system of claim 1, wherein the machine learning classifier comprises at least one of a random forest classifier, a support vector machine (SVM) classifier, an ensemble learning classifier, or a deep neural network.

5. The system of claim 1, further comprising an inspection sub-system, wherein at least one of the one or more training images or the one or more product images are received from the inspection sub-system.

6. The system of claim 1, wherein the controller is further configured to:
   perform one or more image processing operations on the one or more product images.

7. The system of claim 6, wherein performing the one or more image processing operations comprises:
   adjusting a size of the one or more product images with an image scaling operation to generate one or more scaled product images; and
   altering the one or more scaled product images with one or more image sharpening operations.

8. The system of claim 7, wherein the one or more image scaling operations comprise an image upscaling operation.

9. The system of claim 7, wherein the one or more image sharpening operations comprise:
   an image filtering operation performed with a Laplacian filter.

10. The system of claim 6, wherein performing the one or more image processing operations on the one or more product images comprises:
    converting the one or more product images from a first color space system to a second color space system.

11. The system of claim 10, wherein the first color space system comprises a red-green-blue (RGB) color space system, and the second color space system comprises a hue-saturation-value (HSV) color space system.

12. The system of claim 1, wherein the controller is further configured to:
    identify a plurality of pixel clusters within the one or more binarized product images; and
    determine one or more pixel clusters of the plurality of pixel clusters to be associated with the one or more defects.

13. The system of claim 1, wherein the one or more morphological image processing operations comprise at least one of a morphological erosion operation, a morphological dilation operation, a morphological opening operation, or a morphological closing operation.

14. The system of claim 1, wherein the specimen comprises a reticle.

15. The system of claim 1, wherein the controller is configured to generate one or more control signals based on at least one of the one or more refined estimates or the one or more defect type classifications, the one or more control signals configured to selectively adjust one or more process tools.

16. The system of claim 1, wherein the controller is further configured to:
    generate one or more mathematical models configured to correlate the one or more algorithm-estimated defect sizes to one or more known defect sizes of the one or more defects within the one or more training images.

17. The system of claim 16, wherein determining the one or more refined estimates of the one or more defect sizes of the one or more defects based on the one or more algorithm-estimated defect sizes and the one or more defect type classifications comprises:
    determining the one or more refined estimates of the one or more defect sizes of the one or more defects based at least in part on the one or more generated mathematical models.

18. A system for characterizing a specimen, comprising:
    an inspection sub-system configured to acquire one or more images of a specimen; and
    a controller communicatively coupled to the inspection sub-system, the controller including one or more processors configured to execute a set of program instructions stored in memory, the set of program instructions configured to cause the one or more processors to:

receive one or more training images of one or more defects of the specimen from the inspection subsystem, wherein the one or more training images include a set of patch images for defects ranging from 80 to 200 nm and a set of review images for defects larger than 200 nm;

generate one or more machine learning classifiers based on the one or more training images;

receive one or more product images of one or more defects of a specimen from the inspection subsystem, wherein some of the one or more product images are patch images and some of the one or more product images are review images;

determine one or more defect type classifications of the one or more defects of the product images with the one or more machine learning classifiers;

perform one or more morphological image processing operations on the one or more product images;

determine one or more defect sizes for product images having defect sizes between 80 and 200 nm using patch images and determine one or more defect sizes for product images having defect sizes above 200 nm using review images; and determine one or more refined estimates of one or more defect sizes of the one or more defects having a size smaller than 80 nm based on one or more algorithm-estimated defect sizes and the one or more defect type classifications.

19. The system of claim 18, wherein the controller is further configured to:

generate one or more mathematical models configured to correlate the one or more algorithm-estimated defect sizes to one or more known defect sizes of the one or more defects within the one or more training images.

20. The system of claim 19, wherein determining the one or more refined estimates of the one or more defect sizes of the one or more defects based on the one or more algorithm-estimated defect sizes and the one or more defect type classifications comprises:

determining the one or more refined estimates of the one or more defect sizes of the one or more defects based at least in part on the one or more generated mathematical models.

21. A method for characterizing a specimen, comprising:

acquiring one or more training images of one or more defects of a specimen;

generating a machine learning classifier based on the one or more training images;

acquiring one or more product images of one or more defects of a specimen;

determining one or more defect type classifications of the one or more defects with the machine learning classifier;

filtering the one or more product images with one or more smoothing filters;

performing one or more binarization processes to generate one or more binarized product images;

performing one or more morphological image processing operations on the one or more binarized product images;

determining one or more defect sizes for product images having defect sizes between 80 and 200 nm using patch images and determining one or more defect sizes for product images having defect sizes above 200 nm using review images; and determining one or more refined estimates of one or more defect sizes of one or more defects having a size smaller than 80 nm based on one or more algorithm-estimated defect sizes and the one or more defect type classifications.

22. The method of claim 21, wherein the controller is further configured to:

generate one or more mathematical models configured to correlate the one or more algorithm-estimated defect sizes to one or more known defect sizes of the one or more defects within the one or more training images.

23. The method of claim 22, wherein determining the one or more refined estimates of the one or more defect sizes of the one or more defects based on the one or more algorithm-estimated defect sizes and the one or more defect type classifications comprises:

determining the one or more refined estimates of the one or more defect sizes of the one or more defects based at least in part on the one or more generated mathematical models.

* * * * *